Aug. 14, 1945.　　L. A. STEPHENS ET AL　　2,382,269

METHOD OF RECAPPING VEHICLE TIRES

Filed July 19, 1944

INVENTORS,
LESLIE A. STEPHENS
IVEN W. LEDERER
BY
Hyde and Meyer
ATTORNEYS.

Patented Aug. 14, 1945

2,382,269

UNITED STATES PATENT OFFICE 2,382,269

METHOD OF RECAPPING VEHICLE TIRES

Leslie A. Stephens, Hudson, and Iven W. Lederer, Lakewood, Ohio

Application July 19, 1944, Serial No. 545,598

6 Claims. (Cl. 154—14)

This invention relates to a method of recapping or retreading worn pneumatic vehicle tires. While the invention is capable of use with tires of any size or form, it has more particular relation to the larger sizes of tires used, for example, upon trucks or other heavy vehicles.

According to the best methods now in use the worn tire is first ground down or stripped of its rubber tread, either wholly, down to the breaker strip, or partially, in such manner as to give it a more or less uniform rough outer cross sectional contour. This operation is usually performed with a grinding or abrading wheel, sometimes while the tire is inflated and mounted for rotation upon a fixed axis. The amount of rubber thus removed is indeterminate and always is more or less a matter of the judgment or personal equation of the individual operator. Of course, enough is removed to get to the bottom of the worst cracks, crevices and weak spots. But beyond that the end point of removal is hit or miss, with a uniform rough surface which will take the cement as the sole object. Then a layer of so called "camel-back" (raw rubber or rubber composition) is applied to the tread portion and is cemented in place. After applying the camel-back, measurements of the tire are taken, such as of its over-all diameter and its diametrical girth. With these measurements in hand a mold is selected or assembled whose dimensions are within a predetermined range of variation tolerance from those of the tire. Sometimes, the over-all diameter of the tire is measured before buffing it down. The tire is then placed in such mold, the tube is inflated to full load pressure or more, and the parts are vulcanized or cured under heat for the required period.

Such methods have never been entirely satisfactory in practice, chiefly because in the end, the mold is fitted to the tire as nearly as possible, and rarely if ever is a close and satisfactory fit secured, and even then, only by chance. The best fit is no more than a compromise or approximation, with variation one way or the other between the actual size and shape of the rubber tire mass to be treated and those of the mold cavity in which the treatment is produced. If the tire is too large its walls buckle inwardly and form objectionable internal ribs or projections, with distortion of the cords causing premature failure, and if too small the rubber does not entirely fill the cavity, and therefore is not fully cured under proper pressure. Since the stripping or abrading operation has been completed and the camel-back has been applied, it is now too late to correct any variation and secure a more close fit.

These prior methods also do not take account of the fact that two identical tires, made at the same time by the same manufacturer, and suffering identical wear requiring retreading, are found to "grow" differently. For example, if two such tires, deflated, are inflated to the same load bearing pressure, one may be found to increase and the other to decrease in over-all diameter, with accompanying decrease and increase, respectively, in the over-all thickness across the side walls or bellies. This is due to varying effects in use upon the cords, to the effects of over inflation upon one tire and under inflation upon the other, or to other causes producing different effects in the two tires. They become so individual that two tires of the same size marking coming in for retread purposes, but which grow differently should not be stripped or ground down to like cross sectional contour and then be retreaded in the same mold. They must be treated individually and cured in different molds.

The present invention has for its object to improve prior methods of retreading or recapping worn tires in such manner as to produce an accurate fit of the prepared tire assembly in the mold cavity in which it is cured, thus avoiding buckling or spongy, soft or uncured rubber, and insuring maximum wear resisting ability and full life of the product, particularly because the method preserves any special form to which the tire has grown in use, and avoids distortion by any operation which tends to mold it back to its original shape.

Another object is to provide an improved method in which the tire to be retreaded is carefully and closely tailored, as it were, to a close and accurate fit in a preselected mold having a cavity whose size, form and shape are calculated and chosen to produce the finest product out of the particular tire to be retreaded, considered individually.

Still another object is to provide an improved method, the working or operating steps in which are of such character that they may be distributed between and performed by different operators, one of whom is highly skilled and paid accordingly, who by superior judgment is fully qualified to preselect or direct the assembly of the mold in which the curing operation is to be performed and then lay down the lines along which the tire may be tailored to fit the mold cavity, and the other of whom, a laborer with less skill and judgment, and usually at lower wages, performs the more arduous manual labor of completing the grinding or stripping and other operations.

Finally, another object is to provide an improved method of this kind which automatically takes care of and compensates for any variations in growth in any one or more of the tire dimensions, between tires originally of the same form and size, and tailors each tire, individually, to a particular mold in which, when supplied with the appropriate camel-back, it is restored to usefulness with full retention of the particular form or shape to which it has stretched or grown in use, and with the advantage of avoiding the distortion necessary to return it to its original form, and which method also preserves true shoulder form and an intermediate arched tread calculated to take the wear off from the shoulders and thus obtain maximum useful life.

Further objects of the invention in part are obvious and in part will appear more in detail hereinafter.

In the drawing, Fig. 1 is a cross section through a new pneumatic tire;

Figure 1:
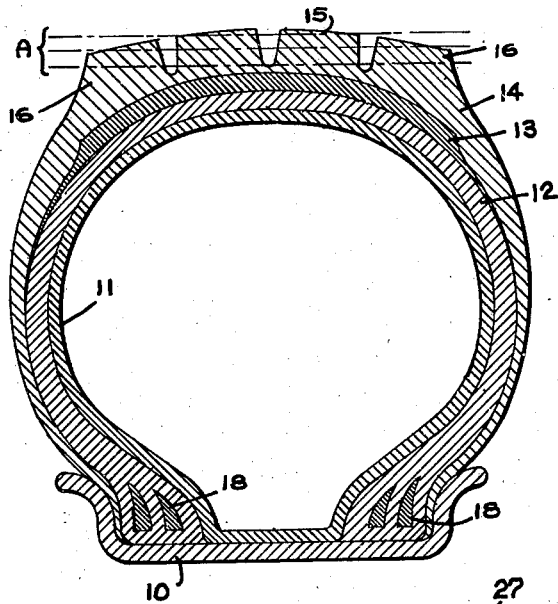

Referring to the drawing, Fig. 1 represents a new pneumatic truck tire, inflated upon a standard flanged rim 10, as in use upon the road. Within the tire is the usual tube 11. The tire itself includes the inner body 12 separated by the cord containing breaker strip 13 from the outer cover 14 having a thickened arched tread portion 15 lying between the shoulder portions 16 where the tread merges into the side walls or bellies terminating in wire reinforced beads 18, as is usual. In normal use of such a tire, inflated properly, wear may be diagrammatically indicated by the several dotted lines A. At first it is heavier at the center of the tread. But as time goes on the wear extends laterally until in the end it may include the shoulders 16 and permit application of the load to them, contrary to good tire practice, which should always protect these shoulders by keeping them off from the ground, to thus lengthen tire life, and which practice dictates tire retreading before the wear reaches the breaker strip or materially damages the shoulders. Accordingly, our improved method proceeds with a tire so worn, although, as before stated, two identical new tires, so worn, may vary in over-all diameter, over-all width across the side walls or bellies, or in other dimensions, on account of variation in growth.

Figure 4:
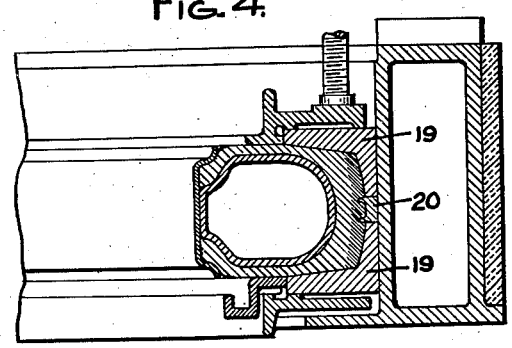
Fig. 4 is a sectional view, somewhat diagrammatic, showing a tire inflated in a mold ready for the curing operation.

The worn tire, as it comes in, is first equipped with a tube and is mounted upon a rim identical with or like that on which it is carried in road use, and is inflated to a material pressure, such as the operating pressure recommended by the tire manufacturer, say 100 pounds or something short of that, to bring the tire to or near its cross sectional contour when in use. In this condition its over-all diameter is measured with suitable calipers or other measuring device. This measurement is of the distance from a point in the center of the tread to a like point diametrically opposite on the other side of the central axis. From this dimension the operator is enabled to preselect, from tables (not shown) prepared for the purpose, the particular mold matrices 19, Fig. 4, that will be large enough to permit ready insertion of the tire into the mold, with minimum clearance, after the removal of any necessary amount of rubber from the tread and cover and the application thereto of the appropriate camel-back. Measurement of the width of the tire tread from shoulder to shoulder permits similar preselection of any necessary spacer or spacers 20 to be inserted between matrices 19 in the finally assembled mold, to thereby produce a tread of the proper width.

In the prepared tables, before referred to, each set or pair of matrices, suitably identified as by number, is shown as suitable for use with tires having a given over-all diameter, and in connection with each pair includes sub identification of various spacers or combinations of spacers, by the use of which with such pair the mold cavity may be varied in its dimension across the tread to accommodate variations in that direction.

Thus the operator, after measuring over-all diameter and tread width, preselects that pair of mold matrices having the smallest diameter equal to or a little greater than that of the tire being retreaded, after the removal of some rubber in stripping, and the application of camel-back of the proper thickness and width, and a spacer or spacers according to the measured tread width. In some cases, of course, no spacer whatever may be necessary, as will be readily understood.

Figure 2:
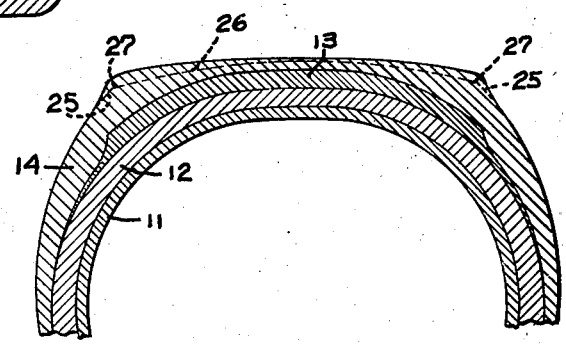
Fig. 2 is a similar view of a worn tire, illustrating the formation of certain slots therein.
Figure 3:
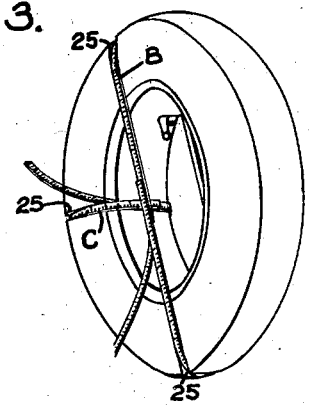
Fig. 3 is a perspective view, illustrating certain girth measurements.

In said tables, opposite the indication for each matrix set, and for each spacer or spacer combination, where any is used, is an indication of tire girth, to wit, the length of a flexible inextensible steel or other tape wrapped completely around the tire and on its opposite faces extending diametrically across its central opening, as at B, Fig. 3, or may be the girth of the tubular form, including the rim, on one side only of the central axis, as at C. These girth indications have been obtained and selected as the result of experience in practice and measurement with respect to each mold or mold combination. Having preselected a definite mold matrix pair, with or without a spacer or spacers, as may be necessary, this girth measurement, determined from the aforesaid tables, becomes the line or landmark along which the tire is now tailored to exactly fit the mold cavity, by procedure as follows:

The tire is first prepared in such manner as to enable an accurate girth measurement to be taken, because as the tire comes in from the road, irregularities, such as surface grooves or configuration of the tread, variations in the wear at the shoulders, or even the shoulder form itself, usually make such accurate measurement difficult or impossible. With the tire inflated on a rim, the skilled operator who preselected the mold parts, or another of equal skill, cuts, abrades with a rasp, or otherwise buffs or forms four diagonal shallow slots 25, Fig. 2, through its shoulders, two each at diametrically opposite selected points on the tire at places in the shoulders where there are no grooves or channels. These slots are formed carefully, removing only enough rubber so that when the steel tape is placed around the tire and laid in the slots it will closely hug the rubber surface all the way around the tire or the tubular form. This girth measurement is then taken and is compared with that indicated in the tables for the selected mold set.

If the measured girth is less than that indicated in the tables, there is some error in the selection of the mold set and another must be chosen, probably with different matrices or different spacers or some other combination having a girth less than the measured girth.

The excess of the measured girth over that shown in the tables indicates how much rubber must be removed to bring the tire to the proper form for further treatment.

The experienced, skilled operator now proceeds to remove that rubber, but only in the zone of the slots before referred to. The operation is carefully performed, manually, usually with a rasp, with girth measurement repeated from time to time to be sure to avoid removing too much. Only enough is removed at the center of the tread to secure the proper over-all diameter. Usually the operator joins the two diagonal slots 25 with an intermediate narrow trench 26 having its bottom arched lengthwise, or across the tire to produce an arched tread on the finished product. This trench joins the diagonal slots at points 27 slightly nearer the center of the tread than are the shoulders. Usually it is necessary also to further deepen the slots 25.

The result of this operation is to establish a base line or landmark, by girth measurement, at the bottom of the slots 25, 26, which is now used as a guide in grinding down or otherwise removing the rubber around the rest of the tire periphery.

In the method so far described, the formation of the diagonal slots 25 ahead of the formation of the cross slots or trenches 26 has the advantage that almost immediately by the formation of the diagonal slots 25 and with the removal of a minimum amount of rubber, the steel tape may be made to very closely fit and hug the tire in taking the first girth measurement. The operator therefore can proceed from that point, gradually forming and deepening the slots 26, until the girth is reduced to the proper value as determined from the tables.

However, some experienced operators find it more convenient to form the trenches 26 first, as follows:

Let us assume that a 9.00 x 20 truck tire comes in for retread which, inflated on a rim to the recommended pressure of 70 pounds is found to measure 38¾ inches in over-all diameter, by caliper measurement. The tread width is 7½ inches.

With these measurements of over-all diameter and tread width, and by reference to the tables, the operator knows, or learns, that the tire must be retreaded in a 40 inch matrix having the necessary spacers to produce the proper tread width. Also, knowing that the camel-back for use in this tire is ½ inch thick, he knows that before applying the camel-back the tire must be cut down to an over-all diameter of 38½ inches, which will leave just enough clearance, after the camel-back is applied, to insert the tire into the mold cavity. He further knows that with this particular mold combination the girth diameter of the mold cavity is 91⅜ inches and that the girth diameter of the tire, taken as at B, before applying the camel-back, should be two inches less than this or 89⅜ inches.

Accordingly, the operator proceeds, at two diametrically opposed points on the tire, as before, to form the cross slots 26 with a rasp. He removes the tread at the center of the tire on the crest of the tread arch until the over-all diameter at that point is reduced to the proper value of 38½ inches. With his rasp he continues the channels 26 outwardly towards the shoulders at the sides of the tread, but he stops the grooves 26 short of the shoulders, at the points 27 before referred to. These points 27, on a 7½ inch tread, would be 6½ inches apart. Then, from the points 27, he forms the diagonal grooves 25.

The entire operation, including formation of slots 26 and grooves 25 is performed carefully and progressively, removing a little rubber at a time, with girth measurements repeated from time to time during the process until the girth measurement has been reduced to the required exact value, 89⅜ inches in this instance.

Having formed his two sets of slots 25, 26, by either method described, the skilled operator has applied to the tire necessary landmarks by which it now may be accurately tailored to exactly fit the one particular mold assembly preselected for it. This operation is performed by relatively unskilled labor.

The tire, on the same rim, and inflated to recommended pressure, as before, and also preferably while rotatably mounted upon a fixed axis, is turned or buffed down, all the way around, to the contour established by the bottoms of the slots 25, 26. This is somewhat like a lathe operation, but usually is performed with a power driven abrading tool. Its effect is to remove all surplus rubber which, in the rotating tire lies outwardly from the axis beyond the bottom of the slots.

Next, a strip of camel-back, of the proper width and thickness, is laid in place on and is cemented or otherwise secured to the tread. If cemented the cement is permitted to dry for whatever period of time is necessary. The size of camel-back stock, both thickness and width, is usually indicated in the aforesaid tables for and opposite to each matrix combination. Its width will be greater than the length of the arched portions of the slots 26 by twice the thickness of the camel-back. In other words, along each edge of the camel-back it exends outwardly beyond the points 27 a distance equal to its own thickness, or approximately so. That is the reason why, in forming the slots 25, 26, they are made to join at points 27 somewhat short of the shoulders, where the slots 25 begin to incline downwardly to merge with the side walls of the tire.

With the camel-back cemented in place, and with the tire either deflated or inflated with relatively low presure, the tire is now inserted into the mold, or between the matrices thereof; the mold is closed and its parts are clamped together, and the pressure within the tire is raised to the value required for curing, usually 100 to 175 pounds for a large truck tire. This pressure expands the tube and carcass and forces the raw rubber or composition of the camel-back outwardly into and fills all crevices of the mold cavity. When full pressure is obtained the mold cavity is completely filled, with all rubber under uniform pressure and density, and with the raw or uncured rubber in close contact with the heated matrix surfaces, and with the material so distributed as to prevent buckling or the formation of ribs or projections, internally, as before described. Moreover the tire has been measured and fitted to one particular preselected mold cavity, while inflated and on a rim and with the same shape and form to which it has stretched or grown in service. No allowance whatever is made for tolerance variation. The fit is exact. Consequently the tire now may be vulcanized in that form and thus preserve it and all its advantages. There is no tendency to distort the prepared carcass by forcibly shaping it to a mold cavity which it does not fit, with consequent cord distortion which might cause premature failure. In this condition the tire assembly is subjected with heat to the curing or vulcanizing operation for the appropriate period and is then removed from the mold.

By this method each tire is individually exactly fitted to a particular mold consisting of two or more matrix parts, with or without spacers, the mold assembly being preselected for the particular tire. The tailoring operation has been conducted by removal of surplus material to an exact end point determined by the girth measurement utilized when the aforesaid slots are produced or formed. Consequently the retread becomes an integral part of the tire as a whole, with its cured rubber under uniform strain and fully cured throughout, assuring maximum life from the finished product. The finished product has a cross sectional contour generally similar to the original tire, but exactly like the special contour to which it has grown in service, and preserves its shoulder form and arched tread. The method enables the more important steps to be performed by highly skilled labor, with the more arduous tasks performed by unskilled labor, thus reducing the cost. Both spongy rubber and buckling are entirely avoided and long tire life is assured.

The invention, of course, may be carried out or put into use with or in connection with any suitable form or arrangement of molds, those shown in the drawing being selected and indicated more or less conventionally merely for purposes of illustration.

Further advantages of the invention will be apparent to those skilled in the art.

What we claim is:

1. The method of retreading a worn pneumatic tire by retread vulcanizing in a mold in a manner to preserve any special form to which the tire has grown in service, comprising measuring the width and over-all diameter of the worn tire while under material pressure on a rim, thereby to predetermine its width and its over-all diameter after necessary buffing, selecting a mold having a cavity whose width and over-all diameter are equal to or slightly greater than those of the measured tire after buffing and the application of camelback of the required thickness, buffing the tire to reduce its girth dimension to closely correspond to that of the cavity of the preselected mold, with due allowance for the camelback, applying the camelback, inserting the tire into the mold cavity, and curing the tire while under pressure in the mold.

2. A method of the character described in claim 1, in which, after measurement of the width and over-all tire diameter and selection of the mold, two narrow cross slots are formed in the tire at diametrically opposite points thereon to such depth and form that the tire girth dimension at the bottoms of the slots corresponds closely to that of the cavity of the selected mold, with due allowance for the camelback, and the tire is then buffed to reduce its girth dimension around its entire periphery to that at the bottoms of the slots.

3. A method of the character described in claim 1, in which, after measurement of the width and over-all tire diameter and selection of the mold, two narrow cross slots are formed in the tire, at diametrically opposite points thereon, by progressive action with girth measurement repeated from time to time, until said slots reach such depth and form that the tire girth dimension at the bottoms of the slots corresponds closely to that of the cavity of the selected mold, with due allowance for the camelback, and the tire is then buffed to reduce its girth dimension around its entire periphery to that at the bottoms of the slots.

4. The method of preparing a worn pneumatic tire for retread vulcanizing in a mold in a manner to preserve any special form to which the tire has grown in service, comprising measuring the width and over-all diameter of the worn tire while under material pressure on a rim, thereby to predetermine its width and its over-all diameter after necessary buffing, selecting a mold having a cavity whose width and over-all diameter are equal to or slightly greater than those of the measured tire after buffing and application of camelback of the required thickness, and buffing the tire to reduce its girth dimension to closely correspond to that of the cavity of the selected mold, with due allowance for the camelback.

5. A method of the character described in claim 4, in which, after measurement of the width and over-all tire diameter and selection of the mold, two narrow cross slots are formed in the tire at diametrically opposite points thereon, to such depth and form that the tire girth dimension at the bottoms of the slots corresponds closely to that of the cavity of the selected mold, with due allowance for the camelback, and the tire is then buffed to reduce its girth dimension around its entire periphery to that at the bottoms of the slots.

6. A method of the character described in claim 4, in which, after measurement of the width and over-all tire diameter and selection of the mold, two narrow cross slots are formed in the tire, at diametrically opposite points thereon, by progressive action with girth measurement repeated from time to time, until said slots reach such depth and form that the entire girth dimension at the bottoms of the slots corresponds closely to that of the cavity of the selected mold, with due allowance for the camelback, and the tire is then buffed to reduce its girth dimension around its entire periphery to that at the bottom of the slots.

LESLIE A. STEPHENS.
IVEN W. LEDERER.